United States Patent
Ukai et al.

(10) Patent No.: US 7,583,319 B2
(45) Date of Patent: Sep. 1, 2009

(54) DATA RELAY DEVICE, DATA RELAY METHOD AND DATA TRANSMISSION SYSTEM

(75) Inventors: Kaoru Ukai, Tokyo (JP); Takanobu Mukaide, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 830 days.

(21) Appl. No.: 11/253,750

(22) Filed: Oct. 20, 2005

(65) Prior Publication Data

US 2006/0093022 A1      May 4, 2006

(30) Foreign Application Priority Data

Oct. 29, 2004  (JP)  ............................... 2004-316816

(51) Int. Cl.
H04N 9/475  (2006.01)

(52) U.S. Cl. ...................................... 348/515; 348/569

(58) Field of Classification Search ................. 348/515, 348/569, 552, 512, 513, 501; 370/401, 402, 370/465
See application file for complete search history.

(56) References Cited

U.S. PATENT DOCUMENTS 5,666,363 A    9/1997   Osakabe et al.
6,549,909 B1   4/2003   Yamauchi et al.
6,794,995 B2   9/2004   Shimada
7,466,363 B2 * 12/2008  Shimozawa et al. ......... 348/569
7,511,763 B2 *  3/2009  Sasaki ........................ 348/515
2006/0093330 A1 * 5/2006 Shimozawa et al. ........... 386/96

FOREIGN PATENT DOCUMENTS

JP          2004-15104        1/2004

* cited by examiner

Primary Examiner—Brenda Pham
(74) Attorney, Agent, or Firm—Pillsbury Winthrop Shaw Pittman, LLP

(57) ABSTRACT

A relay device employs a control system which notifies control data indicating its own specification to transmitting equipment to receive data in a form matching to its own specification and acquires control data D13 from receiving equipment employing the control system and connected to a latter stage. The relay device determines whether its own specification is in a higher order or not in comparison a specification indicated by the control data D13 with its own specification, and if it is determined that its own specification is in the higher order, rewrites the control data D13 from the receiving equipment by its own control data D12 to notify it to the transmitting equipment. Thereby, the relay device can reproduce the data from the transmitting equipment in accordance with its own specification. At this time, since the relay device converts the received data from the transmitting equipment to transmit it, even the receiving equipment can reproduce it in accordance with an appropriate specification.

11 Claims, 3 Drawing Sheets

F I G. 3A
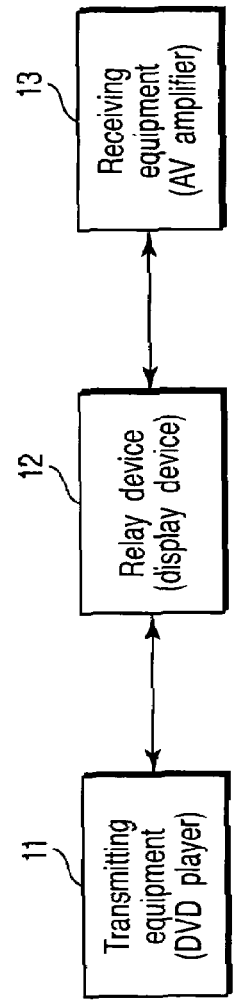
F I G. 3B
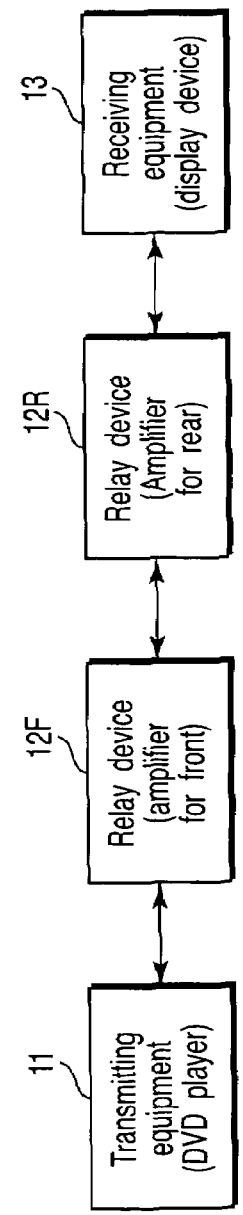
F I G. 3C

DATA RELAY DEVICE, DATA RELAY METHOD AND DATA TRANSMISSION SYSTEM

CROSS-REFERENCE TO RELATED APPLICATIONS

This application is based upon and claims the benefit of priority from prior Japanese Patent Application No. 2004-316816, filed Oct. 29, 2004, the entire contents of which are incorporated herein by reference.

BACKGROUND OF THE INVENTION

1. Field of the Invention

The present invention relates to a data relay device, a data relay method and a data transmission system using the device which is used for a data transmission system corresponding to a high-definition multimedia interface (HDMI) using, for example, high-bandwidth digital content protection (HDCP) and relays to output a data output from content [audio video (AV) data, etc.] transmitting equipment to content receiving equipment.

2. Description of the Related Art

In recent years, the HDMI for a next-generation television has been standardized. This HDMI is a digital interface standard for the next-generation television with a function for a household electrical appliance added thereto while holding low order interchangeability on the basis of a digital video interface (DVI) which has been frequently adopted to a PC display device, etc., and transfers high-definition (HD) video and multi-channel audio through a signal connector to have an advantage for routing wires compared to the DVI. The HDMI is also compatible with the HDCP for a digital image signal.

By the way, an AV data relay device sometime interposes between AV data transmitting equipment and AV data receiving equipment (for example, a case of interposition of an AV amplifier between a DVD reproduction device and a monitor device). In this system configuration, up to now, in the case of the presence of difference in specifications between the AV data receiving equipment and the data relay device, since control data indicating a specification content of the receiving equipment is informed to the transmitting equipment via the relay device, the transmitting equipment transmits data in accordance with the specification of the receiving equipment, then, this system can not take advantage of specification of the relay device.

For example, since the specification of the receiving equipment takes priority if the receiving equipment has the specification of audio 2-channel and the relay device has the specification of audio 5.1-channel, the relay device receives the data of the audio 2-channel from the transmitting equipment and cannot take advantage of the audio 5.1-channel.

An example of the data transmission system employing the above-mentioned HDCP is disclosed in, for example, Jpn. Pat. Appln. KOKAI 2004-015104. The system disclosed in this document allows the relay device to select a set of transmitting equipment in the case of sharing the plurality of sets of transmitting equipment with a single set of receiving equipment. And the system doest take account of the problem in the case that there is a difference in specification between the relay device and the receiving equipment.

As mentioned above, up to this time, in the system configuration in which the data relay device is interposed between the data transmitting equipment and the data receiving equipment, when the specifications differ between the data receiving equipment and the data relay device, the control data indicating the specification content of the receiving equipment is notified to the transmission equipment through the relay device, so that there is the problem that the transmitting equipment transmits data in accordance with the specification of the receiving equipment and the system configuration can not take advantage of the specification of the relay device.

BRIEF SUMMARY OF THE INVENTION

A purpose of the present invention is to provide a data relay device, a data relay method and a data transmission system capable of notifying control data to data transmitting equipment so as to satisfy a specification of data receiving equipment in a latter stage and its own specification even if both specifications differ with each other.

According to a first aspect of the present invention, there is provided a data delay device for connecting receiving equipment which employs a control system to notify control data indicating its own specification to transmitting equipment to receive data in a form matching to its own specification and employs the control system in a latter stage, the data relay device comprising: a control data acquiring device configured to acquire the control data from the receiving equipment; specification determining device configured to determine that its own specification is in a higher order or not in comparison a specification indicated by the control data from the receiving equipment with its own specification; a control data notifying device configured to rewrite the control data from the receiving equipment by its own control data to notify it to the transmitting equipment if the determining device determines that its own specification is in the higher order; a data reproducing device configured to receive the data transmitted from the transmitting equipment to reproduce it in accordance with its own specification; and a data transmitting device configured to convert the received data from the transmitting equipment into the specification of the receiving equipment to transmit it thereto.

According to a second aspect of the present invention, there is provided a data delay method for notifying control data indicating its own specification to transmitting equipment to receive data in a form matching to its own specification, comprising: acquiring control data from receiving equipment employing a control system connected in a latter stage; determining whether its own specification is in a higher order or not in comparison a specification indicated by the control data from the receiving equipment with its own specification; rewriting the control data from the receiving equipment by its own control data and notifying it to the transmitting equipment when it is determined in the determining that its own specification is in the higher order; receiving the data transmitted from the transmitting equipment and reproducing it in accordance with its own specification; and converting the received data from the transmitting equipment into the specification of the receiving equipment and transmitting it thereto.

According to a third aspect of the present invention, there is provided a data transmission system, comprising: a transmitting equipment for acquiring control data indicating a specification to transmit data in a form matching to the specification; a receiving equipment for notifying control data indicating its own specification to receive the data from the transmitting equipment; and a data relay device connected between the transmitting equipment and the receiving equipment, wherein the data relay device comprises: a control data acquiring device configured to acquire the control data from the receiving equipment; a specification determining device configured to determine whether its own specification is in a higher order or not in comparison a specification indicated by the control data from the receiving equipment with its own specification; a control data notifying device configured to rewrite the control data from the receiving equipment by its own control data to notify it to the transmitting equipment when the specification determining device determines that its own specification is in the higher order; a data reproducing device configured to receive the data transmitted from the transmitting equipment to reproduce it in accordance with its own specification; and a data transmitting device configured to convert the received data from the transmitting equipment into the specification of the receiving equipment to transmit it thereto.

Additional advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A, FIG. 3B and FIG. 3C are block diagrams showing examples of connections of the transmission system shown in FIG. 1.

DETAILED DESCRIPTION OF THE INVENTION

Figure 1:
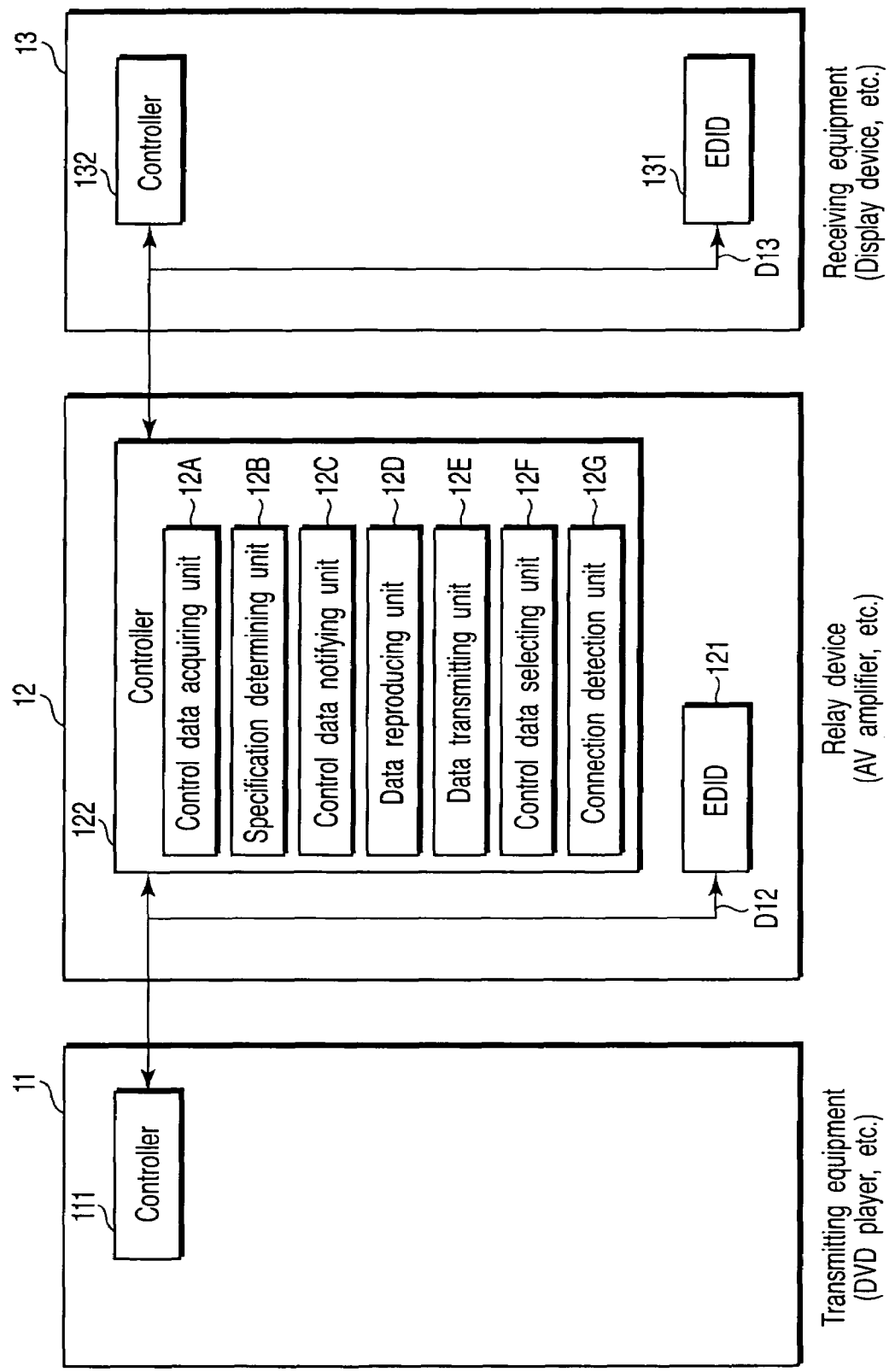
FIG. 1 is a block diagram showing a configuration of an AV data transmission system regarding the present invention.

Hereinafter, embodiments of the present invention will be described in detail by referring to the drawings.

FIG. 1 is the block diagram showing the configuration of the AV data transmission system regarding the present invention. In FIG. 1, transmitting equipment (TX) 11 is, for example, a DVD player, a set-top box as a digital broadcasting tuner and the like. A relay device (RP) 12 is an AV amplifier, a video recording and reproducing device and the like for example. Receiving equipment (RX) 13 is a display device, a TV receiver, a video recording and reproducing device or the like for example.

Here, the TX 11, the RP 12 and the RX 13 compose a data transmission system corresponding to the HDMI with the HDCO adopted thereto. The RP 12 and the RX 13 have areas EDID 121 and EDID 131 holding control data D12 and D13 therein and controllers 122 and 132 controlling data held in the EDID 121 and EDID 131, respectively. The control data D12 and D13 held in the EDID 121 and EDID 131 is data indicating forms of video signals such as its own specifications, for example, resolutions of video data, cycles of video frames, the number of pixels, the number of lines and signal forms (RGB signal formulas or brightness/color difference signal formulas), or data indicating forms of audio signals such as the number of sample bits and sampling frequencies of audio data and the number of channels corresponding to the number of loud speakers, etc. The transmitting equipment 11 has a controller 111 for acquiring control data from the equipment connected thereto to set a decode method.

The controller 122 of the relay device 12 has a control data acquiring unit 12A, a specification determining unit 12B, a control data notifying unit 12C, a data reproducing unit 12D, a data transmitting unit 12E, a control data selecting unit 12F and a connection detection unit 12G as its program processing function.

In the above-described system configuration, processing of the RP 12 to be a feature of the present invention will be described by referring to FIG. 2.

Figure 2:
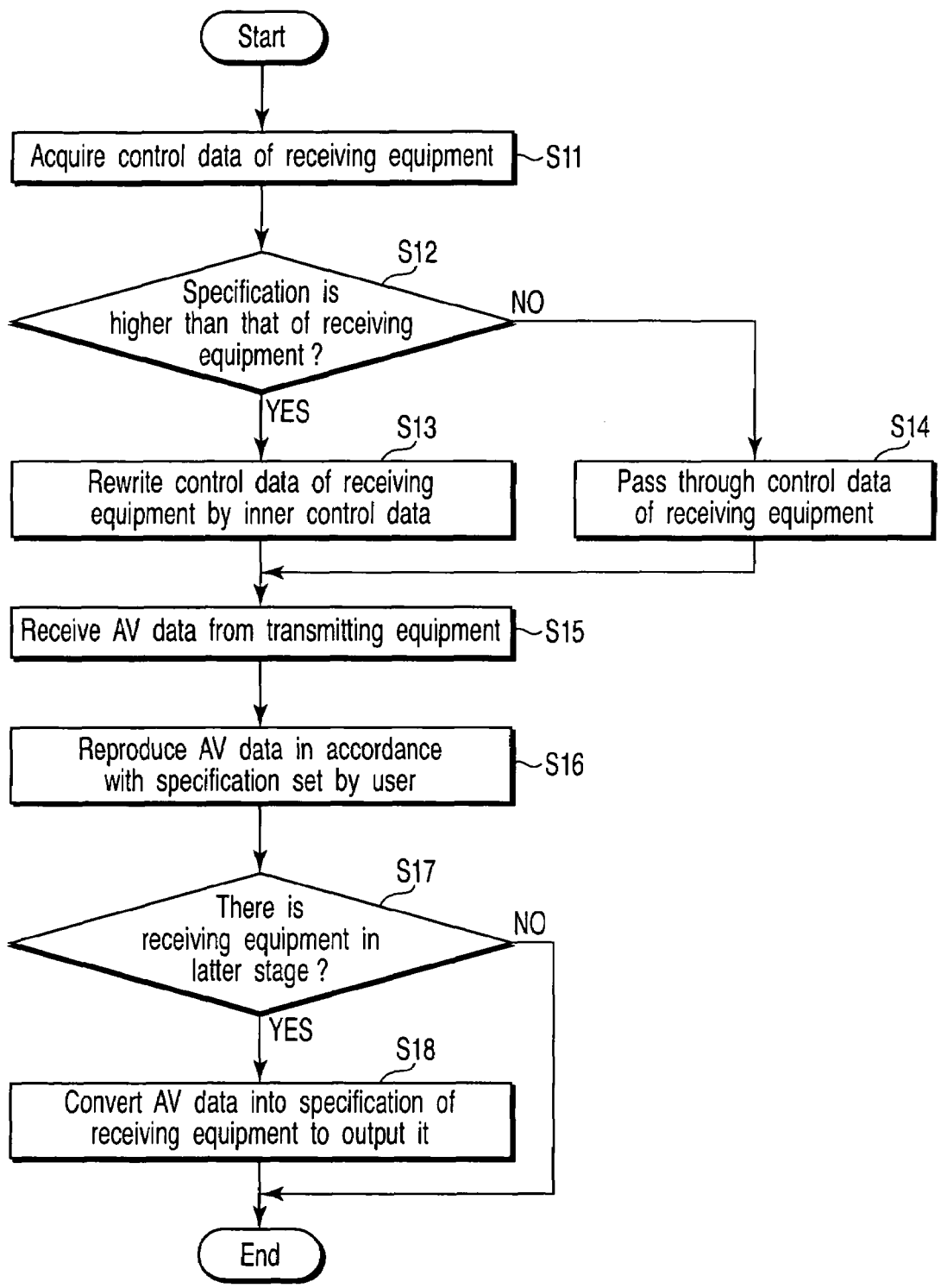
FIG. 2 is a flow chart showing a processing procedure executed by a controller of a relay device shown in FIG. 1.

FIG. 2 shows a processing procedure executed by the controller 122 of the RP 12, at first, at the time of starting, the controller 122 detects the connection of the RX 13 by means of a function of the connection detection unit 12G to acquire the control data D13 from the EDID 131 of the RX 13 by means of the control data acquiring unit 12A (step S11). Then, the specification determining unit 12B compares the specification indicated by the control data D12 held in its own EDID 121 with the specification indicated by the control data D13 of the RX 13 to determine whether or not its own specification has an order higher than that of the specification of the RX 13 (step S12).

In the step S12, if its own specification has a higher order, the control data notifying unit 12C rewrites the control data of the RX 13 by inner control data to notify it to the TX 11 (step S13). If its own specification does not have the higher order (in the case of an equivalent order or a lower order), the controller 122 passes through the control data of the RX 13 to notify it to the TX 11 (step S14). At this time, the TX 11 decodes to transmit AV data in a format matched to the specification of the control data to be notified.

The controller 122 receives the AV data transmitted form the TX 11 (step S15). The data reproducing unit 12D reproduces the AV data in accordance with the specification set by a user (step S16). Here, the connection detection unit 12G determines whether or not there is the RX 13 in a latter step of the RP 12 (step S15), if there is the RX 13, the data transmitting unit 12E converts the AV data into a format matching to the specification indicating the control data of the RX 13 acquired in advance to output it to the RX 13 (step S18), then, the controller 122 ends this procedure. Thereby, the RX 13 becomes possible to reproduce the AV data in accordance with its own specification. If it is determined, in the latter stage, that there is no RX 13, the controller 122 passes the step S18 to ends the procedure.

As an example, transmission of audio data will be described. If the format in reproduction at the RP 12 is set to the Dolby digital (5.1-channel) and if the format in reproduction at the RX 13 is set to an LPCM (2-channel), the RP 12 receives the control data D13 of the LPCM (2-channel) from the RX 13. Here, its own specification of the RP 12 can reproduce the Dolby digital and has an order higher than that of the LPCM (2-channel) to be the specification of the RX 13, so that the RP 12 transmits the control data D12 to the TX 11, as the Dolby digital.

The TX 11 transmits the data of the Dolby digital to the RP 12, as the audio data. Therefore, the RP 12 can reproduce the Dolby digital. At this time, the RP 12 transmits the data received from the TX 11 to the RX 13, but the RX 13 can reproduce the audio data in not more than the LPCM (2-channel), so that the RP 12 decodes the audio data to data of the LPCM (2-channel) inside the RP 12 to transmit it to the RX 13. Thereby, the RP 12 becomes possible to reproduce the Dolby digital audio and the RX 13 becomes possible to reproduce the LPCM (2-channel).

Accordingly, in the data transmission system configured as described above, in the RP 12, even when the specification of the RX 13 and its own specification are different with each other, since the control data is rewritten and notified to the TX 11 so as to satisfy both specifications, the merit of the specification of the RP 12 can be maximized.

By the way, in the above-mentioned embodiment, although the RP 12 rewrites the control data from the RX 13 to notify it to the TX 11, the embodiment can achieve an effect by proving the control data selecting unit 12F with the controller 122 of the RP 12 in order to select the use of the control data of the RX 13 or the use of the control data rewritten by the RP 12. It is conceivable for the way of the selection to set it on the basis of a preset value or dramatically vary it by the user.

The transmission system in the HDCP adapts a hot plug-and-play function as the function of the connection detection unit 12G to determine the presence or absence of the connection of equipment by means of a connected signal line. The RP device 12 automatically detects the connection state of the RX 13 through the hot plug-and-play, and notifies its own control data to the TX 11, in a state in which the RX 13 is not connected. In the state of under reproduction of the data from the TX 11, if the connection of the RX 13 is detected, the RP 12 acquires the control data from the RX 13 to determine whether its own specification is in the higher order or not in comparison the specification of the RX 13 with its own specification.

In this determination, if its own specification is in the higher order, the RP 12 converts the received data from the TX 11 into the specification of the RX 13 to transmit it to the RX 13. That is, if the specification of the RP 12 is in the order higher than that of the specification of the RX 13, it is possible to directly convert the received data to transmit it to the RX 13 without rewriting the control data of the RX 13 to notify it to the TX 11 and possible to shorten a processing time.

By the way, a generic AV system, as shown in FIG. 3A connects a DV player as the TX 11, an AV amplifier as the RP 12, a display device as the RX 13 in this order. However, in the HDCP transmission system, since the physical connection order is not concerned, as shown in FIG. 3B for example, the connection of the DVD player as the TX 11, the display device as the RP 12 and the AV amplifier as the RX 13 in this order functions similarly. A plurality of RPs 12 may be accepted in the HDCP transmission system. As shown in FIG. 3C for example, the HDCP transmission system may also connects an AV amplifier 12F for a front loud speaker and an AV amplifier 12R for a rear loud speaker, as the RPs 12. The important question is that the equipment to be the RP 12 may has a function of rewriting the control data from the RX 13 and has a function of converting the specification of the data from the TX 11 to output it to the RX 13.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data relay device for connecting receiving equipment which employs a control system to notify control data indicating its own specification to transmitting equipment to receive data in a form matching to its own specification and employs the control system in a latter stage, the data relay device comprising:

a control data acquiring device configured to acquire the control data from the receiving equipment;

specification determining device configured to determine that its own specification is in a higher order or not in comparison a specification indicated by the control data from the receiving equipment with its own specification;

a control data notifying device configured to rewrite the control data from the receiving equipment by its own control data to notify it to the transmitting equipment if the determining device determines that its own specification is in the higher order;

a data reproducing device configured to receive the data transmitted from the transmitting equipment to reproduce it in accordance with its own specification; and a data transmitting device configured to convert the received data from the transmitting equipment into the specification of the receiving equipment to transmit it thereto.

2. The data relay device according to claim 1, wherein the control data notifying device passes through the control data from the receiving equipment to notify it to the transmitting equipment when the determining device determines that its own specification is not in the order higher than that of the receiving equipment.

3. The data relay device according to claim 1, further comprising:

a selecting device configured to select either one of the control data from the receiving equipment and its own control data, as control data to be notified to the transmitting equipment.

4. The data delay device according to claim 1, further comprising:

a connection detector configured to detect a connection of the receiving equipment, wherein the control data notifying device notifies its own control data to the transmitting equipment when the connection detection device does not detect a connection of the receiving equipment.

5. The data relay device according to claim 4, wherein when the connection detection means detects the connection of the receiving equipment in a state that the data reproducing device reproduces the data from the transmitting equipment, the control data acquiring device acquires the control data from the receiving equipment to determine whether its own specification is in the higher order or not in comparison the specification of the receiving equipment with its own specification, and the data transmitting device converts the received data from the transmitting equipment into the specification of the receiving equipment to transmit it to the receiving equipment when the specification determining means determines that its own specification is in the higher order.

6. A data relay method for notifying control data indicating its own specification to transmitting equipment to receive data in a form matching to its own specification, the method performed by a data relay device, comprising:

acquiring control data from receiving equipment employing a control system connected in a latter stage;

determining whether its own specification is in a higher order or not in comparison a specification indicated by the control data from the receiving equipment with its own specification;

rewriting the control data from the receiving equipment by its own control data and notifying it to the transmitting equipment when it is determined in the determining that its own specification is in the higher order;

receiving the data transmitted from the transmitting equipment and reproducing it in accordance with its own specification; and converting the received data from the transmitting equipment into the specification of the receiving equipment and transmitting it thereto.

7. The data relay method according to claim 6, wherein the notifying passes through the control data from the receiving equipment to notify it to the transmitting equipment when the determining determines that its own specification is not in the order higher than that of the receiving equipment.

8. The data relay method according to claim 6, further comprising:

selecting either one of the control data from the receiving equipment and its own control data, as control data to notify it to the transmitting equipment.

9. The data relay method according to claim 6, further comprising:

detecting automatically a connection of the receiving equipment, wherein the notifying notifies its own control data to the transmitting equipment when the connection the detecting does not detect the connection of the receiving equipment.

10. The data relay method according to claim 9, wherein when the detecting detects the connection of the receiving equipment in a state that the reproducing reproduces the data from the transmitting equipment, the acquiring acquires the control data from the receiving equipment;

the determining determines whether its own specification is in the higher order or not in comparison the specification of the receiving equipment with its own specification;

the converting converts the received data from the transmitting equipment into the specification of the receiving equipment when its own specification is in the higher order.

11. A data transmission system, comprising:

a transmitting equipment for acquiring control data indicating a specification to transmit data in a form matching to the specification;

a receiving equipment for notifying control data indicating its own specification to receive the data from the transmitting equipment; and a data relay device connected between the transmitting equipment and the receiving equipment, wherein the data relay device comprises:

a control data acquiring device configured to acquire the control data from the receiving equipment;

a specification determining device configured to determine whether its own specification is in a higher order or not in comparison a specification indicated by the control data from the receiving equipment with its own specification;

a control data notifying device configured to rewrite the control data from the receiving equipment by its own control data to notify it to the transmitting equipment when the specification determining device determines that its own specification is in the higher order;

a data reproducing device configured to receive the data transmitted from the transmitting equipment to reproduce it in accordance with its own specification; and a data transmitting device configured to convert the received data from the transmitting equipment into the specification of the receiving equipment to transmit it thereto.

* * * * *